(12) United States Patent
Kim et al.

(10) Patent No.: US 12,287,673 B2
(45) Date of Patent: Apr. 29, 2025

(54) DISPLAY DEVICE

(71) Applicant: Samsung Display Co., Ltd., Yongin-si (KR)

(72) Inventors: Hun-Tae Kim, Seoul (KR); Jinhyoung Kim, Seoul (KR); Dongho Yoon, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 371 days.

(21) Appl. No.: 17/678,140

(22) Filed: Feb. 23, 2022

(65) Prior Publication Data

US 2022/0374047 A1 Nov. 24, 2022

(30) Foreign Application Priority Data

May 21, 2021 (KR) ........................ 10-2021-0065360

(51) Int. Cl.
*G06F 1/16* (2006.01)
*G06F 1/20* (2006.01)
*G06F 1/18* (2006.01)

(52) U.S. Cl.
CPC ............ *G06F 1/1652* (2013.01); *G06F 1/203* (2013.01); *G06F 1/1656* (2013.01); *G06F 1/183* (2013.01)

(58) Field of Classification Search
CPC ...... G06F 1/1652; G06F 1/203; G06F 1/1656; G06F 1/183
See application file for complete search history.

(56) References Cited

U.S. PATENT DOCUMENTS

| 10,103,204 | B2 | 10/2018 | Yang |
| 10,705,565 | B2 | 7/2020 | Park |
| 10,930,883 | B2 | 2/2021 | Park |
| 11,132,945 | B2 | 9/2021 | Kim et al. |
| 11,245,092 | B2 | 2/2022 | Shin et al. |
| 2013/0002977 | A1* | 1/2013 | Park ..................... G02F 1/13452 349/58 |
| 2019/0014670 | A1* | 1/2019 | Lee ........................ G06F 1/1601 |
| 2020/0037442 | A1* | 1/2020 | Keum .................... H05K 1/147 |
| 2020/0245501 | A1* | 7/2020 | Wu ........................... F28F 3/02 |
| 2022/0404877 | A1* | 12/2022 | Sakamoto .............. H05B 33/02 |

FOREIGN PATENT DOCUMENTS

| KR | 1020180002047 A | | 1/2018 |
| KR | 1020180022037 A | | 3/2018 |
| KR | 20180062271 | * | 6/2018 |
| KR | 1020180062271 A | | 6/2018 |
| KR | 1020190098289 A | | 8/2019 |
| KR | 1020190124844 A | | 11/2019 |
| KR | 1020190140130 A | | 12/2019 |
| KR | 1020200097850 A | | 8/2020 |

\* cited by examiner

*Primary Examiner* — Hung Q Dang
(74) *Attorney, Agent, or Firm* — CANTOR COLBURN LLP

(57) ABSTRACT

A display device includes a display panel including a folding region at which the display panel is foldable, and in order from the display panel a first plate facing the display panel and including a lower surface furthest from the display panel, a heat dissipation layer facing the first plate, and a second plate facing the heat dissipation layer, the second plate defining a first opening which exposes the lower surface of the first plate to outside the second plate.

20 Claims, 10 Drawing Sheets

DISPLAY DEVICE

This application claims priority to Korean Patent Application No. 10-2021-0065360, filed on May 21, 2021, and all the benefits accruing therefrom under 35 U.S.C. § 119, the entire contents of which are hereby incorporated by reference.

BACKGROUND

(1) Field

The present disclosure herein relates to a display device, and more particularly, to a display device having improved waterproofing properties.

(2) Description of the Related Art

A display device includes an active region which is activated according to an electrical signal. The display device may provide information to outside the display device such as to a user, by detecting an input applied from outside the display device and through the active region and simultaneously displaying various images. As variously-shaped display devices have been developed, active regions having various shapes are being implemented.

SUMMARY

The present disclosure provides a display device having improved heat dissipation and waterproofing properties.

An embodiment provides a display device including a display panel including a first non-folding region, a folding region, and a second non-folding region which are sequentially arranged along a first direction, a first plate under the display panel, a heat dissipation layer under the first plate, and a second plate under the heat dissipation layer, where a first opening exposing a portion of the lower surface of the first plate is defined in the second plate.

In an embodiment, the display device may further include a printed circuit board connected to the display panel and under the second plate. The printed circuit board may include a base layer and a conductive pattern which is on the base layer and inside the first opening defined in the second plate.

In an embodiment, a contact part may be on the lower surface of the first plate, and the conductive pattern may come in contact with the contact part.

In an embodiment, the printed circuit board may further include a timing controller facing the conductive pattern with the base layer interposed therebetween.

In an embodiment, the first plate may include a plate folding portion in which a plurality of openings overlapping the folding region are defined.

In an embodiment, the display device may further include a cover layer between the first plate and the heat dissipation layer, and the cover layer may cover the plurality of openings.

In an embodiment, the display device may further include a step compensation layer between the cover layer and the second plate and spaced apart from the heat dissipation layer along the first direction.

In an embodiment, a second opening exposing a portion of the lower surface of the first plate may be defined in the step compensation layer, and the conductive pattern may be inside the second opening.

In an embodiment, a third opening exposing a portion of the lower surface of the first plate may be defined in the cover layer, and the conductive pattern may be inside the third opening.

In an embodiment, the second plate may include a first sub-plate overlapping the first non-folding region and a second sub-plate overlapping the second non-folding region, where the first sub-plate and the second sub-plate may be spaced apart from each other along the first direction.

In an embodiment, the first opening may be defined in the second sub-plate, and the printed circuit board may be under the second sub-plate.

In an embodiment, the display device may further include a sealing layer on the second sub-plate and not overlapping the first opening on a plane.

In an embodiment, the display device may further include a first adhesive layer between the first plate and the heat dissipation layer, and a second adhesive layer between the heat dissipation layer and the second plate.

In an embodiment, the first adhesive layer may be in contact with the lower surface of the first plate and the upper surface of the heat dissipation layer, and the second adhesive layer may be in contact with the lower surface of the heat dissipation layer and the upper surface of the second plate.

In an embodiment, the first adhesive layer, the second adhesive layer, and the heat dissipation layer may not overlap the first opening on a plane.

In an embodiment, the display device may further include an anti-reflection layer on the display panel, and a protective film on the anti-reflection layer.

In an embodiment, the heat dissipation layer may include a first heat dissipation portion overlapping the first non-folding region, a second heat dissipation portion overlapping the second non-folding region, and a third heat dissipation portion overlapping the folding region and partially bent.

In an embodiment, a display device includes a display panel including a first non-folding region, a folding region, and a second non-folding region which are sequentially arranged along a first direction, a printed circuit board connected to the display panel and under the second plate, a first plate under the display panel, a heat dissipation layer under the first plate, and a second plate under the heat dissipation layer, where the printed circuit board includes a base layer and a conductive pattern which is on the base layer, a first opening is defined in the second plate, and the conductive pattern is inside the first opening.

In an embodiment, a display device includes a display panel including a first non-folding region, a folding region, and a second non-folding region which are sequentially arranged along a first direction, a printed circuit board connected to the display panel and under the second plate, a first plate under the display panel, a heat dissipation layer under the first plate, and a second plate under the heat dissipation layer, where a first opening is defined in a portion of the second plate overlapping the first non-folding region, and at least a portion of the printed circuit board is inside the first opening.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the invention. In the drawings.

DETAILED DESCRIPTION

Figure 1A:
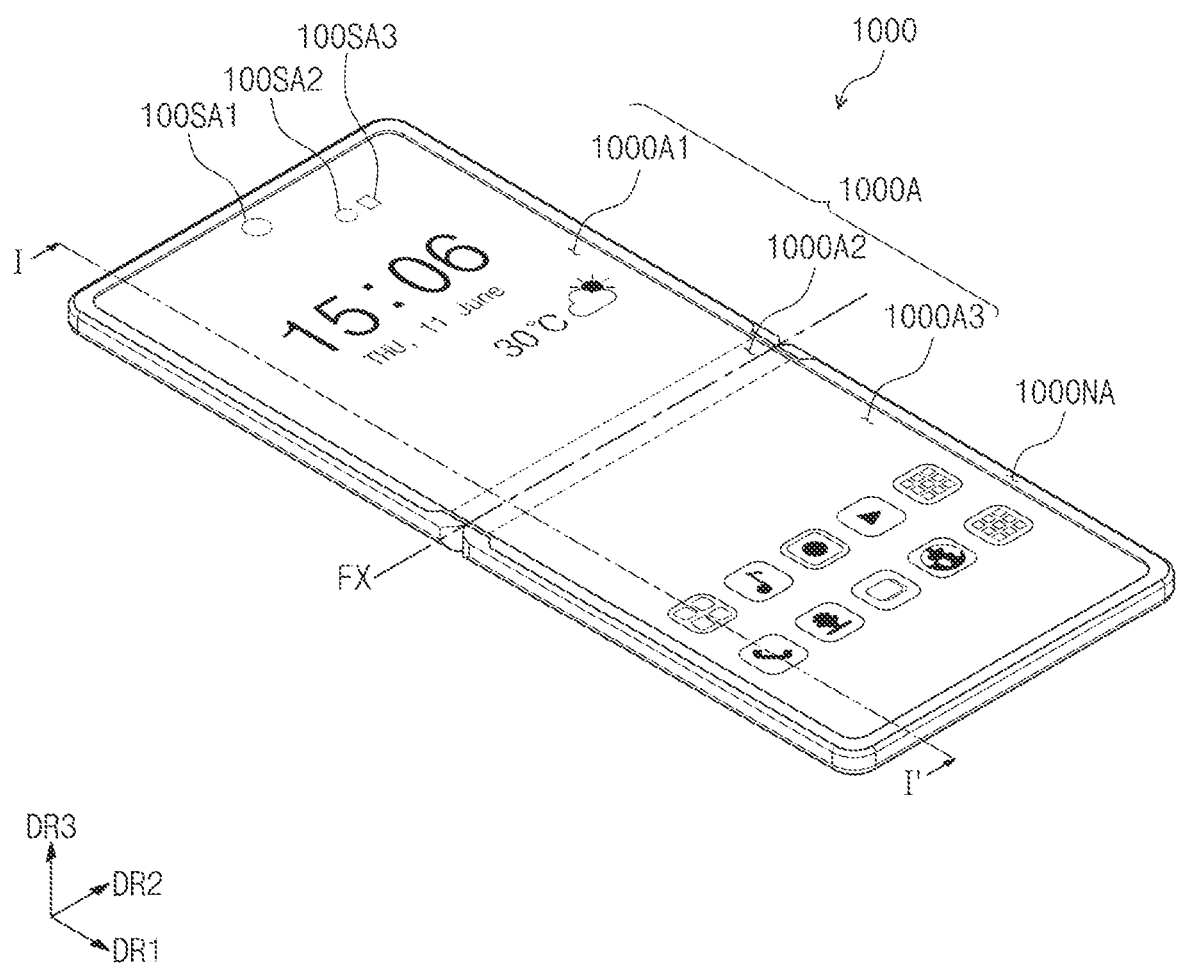
FIG. 1A is a perspective view of an embodiment of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, it will be understood that when an element (or region, layer, portion, etc.) is referred to as being related to another element such as being "on", "connected to" or "coupled to" another element, it can be directly on, connected or coupled to the other element, or intervening elements may be present.

Like reference numerals refer to like elements throughout. As used herein, a reference number may indicate a singular element or a plurality of the element. For example, a reference number labeling a singular form of an element within the drawing figures may be used to reference a plurality of the singular element within the text of specification. In addition, in the drawings, the thicknesses, ratios, and dimensions of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations that the associated configurations can define.

It will be understood that, although the terms first, second, etc. may be used herein to describe various elements, these elements should not be limited by these terms. These terms are only used to distinguish one element from another element. For example, a first element could be termed a second element without departing from the scope of the present invention. Similarly, the second element may also be referred to as the first element. The terms of a singular form include plural forms unless otherwise specified.

Terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or groups thereof, but do not preclude the presence or addition of one or more other features, integers, steps, operations, elements, components, and/or groups thereof.

In this specification, the expression "being directly disposed" may mean that there is no layer, film, region, plate, or the like which is added between a part of a layer, film, region, plate, or the like and another part. For example, the expression "being directly disposed" may mean being disposed between two layers or two members without an additional member such as an adhesive member interposed therebetween, being disposed to form an interface therebetween, etc.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be described with reference to the accompanying drawings.

Figure 1B:
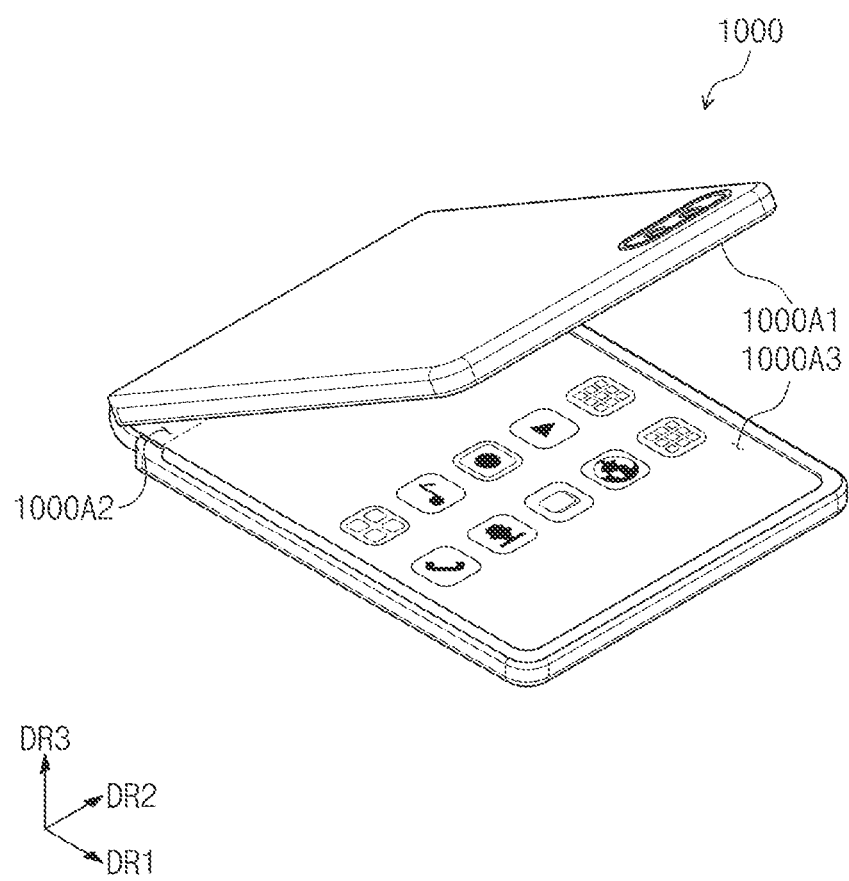
FIG. 1B is a perspective view of an embodiment of the display device.

FIG. 1A is a perspective view of an embodiment of a display device 1000. FIG. 1B is a perspective view of the display device 1000. FIG. 1A illustrates the display device 1000 which is unfolded, and FIG. 1B illustrates the display device 1000 which is folded.

Referring to FIGS. 1A and 1B, the display device 1000 may be a device which is activated according to an electrical signal. In an embodiment, for example, the display device 1000 may be a mobile phone, a tablet, a car navigation system, a game machine, or a wearable device, but is not limited thereto. FIG. 1A exemplarily illustrates that the display device 1000 is a mobile phone.

The display device 1000 may display an image through an active region 1000A. When the display device 1000 is unfolded, the active region 1000A may include or be provided in a plane defined by a first direction DR1 and a second direction DR2 crossing each other. A thickness direction of the display device 1000 and various components or layers thereof may be parallel to a third direction DR3 crossing the first direction DR1 and the second direction DR2. Accordingly, the front surface (or upper surface) and the rear surface (or lower surface) of the members constituting the display device 1000 may be defined based on the third direction DR3.

The active region 1000A may include a first region 1000A1 (e.g., first active region), a second region 1000A2 (e.g., second active region), and a third region 1000A3 (e.g., third active region). The second region 1000A2 may be bendable based on a folding axis FX extending in (or along)

the second direction DR2. Accordingly, the first region 1000A1 and the third region 1000A3 may each be referred to as a non-folding area or region, and the second region 1000A2 may be referred to as a folding area or region. Various components or layers of the display device 1000 may include one or more of the active regions described above. The display device 1000 may be foldable or bendable at the second region 1000A2. Various components or layers of the display device 1000 may be foldable or bendable together with each other, without being limited thereto.

When the display device 1000 is folded, the first region 1000A1 and the third region 1000A3 may face each other. Accordingly, the display device 1000 which is fully folded may include the active region 1000A not exposed to outside of the display device 1000, and may be referred to as being in-folded. However, this is an example, and the operation of the display device 1000 is not limited thereto.

In an embodiment, the display device 1000 which is folded may include the first region 1000A1 and the third region 1000A3 which face away from each other. Accordingly, the active region 1000A may be exposed to outside the display device 1000, and the display device 1000 which is folded may be referred to as being out-folded.

The display device 1000 may be capable of performing only one of in-folding and out-folding operations. Alternatively, the display device 1000 may perform both an in-folding operation and an out-folding operation. In this case, a same region of the display device 1000, for example, the second region 1000A2 may be in-folded and out-folded. Alternatively, one partial region of the display device 1000 may be in-folded and another partial region thereof may be out-folded.

FIGS. 1A and 1B exemplarily illustrate one folding area (or region) and two non-folding areas (or regions), but the number of folding areas and non-folding areas is not limited thereto. In an embodiment, for example, the display device 1000 may include more than two non-folding areas and a plurality of folding areas disposed between adjacent non-folding areas among the plurality of non-folding areas.

FIGS. 1A and 1B exemplarily illustrate that the folding axis FX is parallel to the short axis of the display device 1000, but is not limited thereto. In an embodiment, for example, the folding axis FX may extend along the long axis of the display device 1000, such as along a direction parallel to the first direction DR1. In this case, the first region 1000A1, the second region 1000A2, and the third region 1000A3 may be sequentially arranged along the second direction DR2.

The display device 1000 may have a plurality of sensing regions 100SA1, 100SA2, and 100SA3 defined therein. Although three sensing regions 100SA1, 100SA2, and 100SA3 are illustrated in FIG. 1A, the number of the plurality of sensing regions 100SA1, 100SA2, and 100SA3 is not limited thereto. Various components or layers of the display device 1000 may include one or more sensing region described above.

The plurality of sensing regions 100SA1, 100SA2, and 100SA3 may include a first sensing region 100SA1, a second sensing region 100SA2, and a third sensing region 100SA3. In an embodiment, for example, the first sensing region 100SA1 may overlap (or correspond to) a camera module, and the second sensing region 100SA2 and the third sensing region 100SA3 may respectively overlap (or correspond to) a proximity illuminance sensor, but are not limited thereto. The camera module and/or the proximity illuminance sensor may be an electronic module which provides a function of the display device 1000 such as light-sensing, pressure-sensing, proximity-sensing, etc. without being limited thereto.

Each of a plurality of electronic modules may receive an external input transmitted through the first sensing region 100SA1, the second sensing region 100SA2, and/or the third sensing region 100SA3, or may provide an output through the first sensing region 100SA1, the second sensing region 100SA2, and/or the third sensing region 100SA3.

The first sensing region 100SA1, the second sensing region 100SA2, and the third sensing region 100SA3 may be included in the active region 1000A. That is, an image may be display at the first sensing region 100SA1, the second sensing region 100SA2, and/or the third sensing region 100SA3. The transmittance (e.g., light transmittance) of each of the first sensing region 100SA1, the second sensing region 100SA2, and the third sensing region 100SA3 may be higher than that of the active region 1000A. In addition, the transmittance of the first sensing region 100SA1 may be higher than those of the second sensing region 100SA2 and the third sensing region 100SA3, respectively. Without being limited thereto, however, at least one of the first sensing region 100SA1, the second sensing region 100SA2, and the third sensing region 100SA3 may be provided to a non-active region 1000NA, instead of the active region 1000A.

According to an embodiment, a number of the plurality of electronic modules may overlap the active region 1000A, and others of the plurality of electronic modules may be surrounded by the active region 1000A. That is, regions corresponding to the others of the plurality of electronic modules and surrounded by the active region 1000A may be a non-active portion of the active region 1000A. Accordingly, a region in which the plurality of electronic modules are to be disposed may not be provided to the non-active region 1000NA around the active region 1000A, but may instead be within an overall planar area of the active region 1000A. As a result, the area ratio of the active region 1000A to the entire surface of the display device 1000 (e.g., total planar area of the display device 1000) may be increased.

Figure 2:
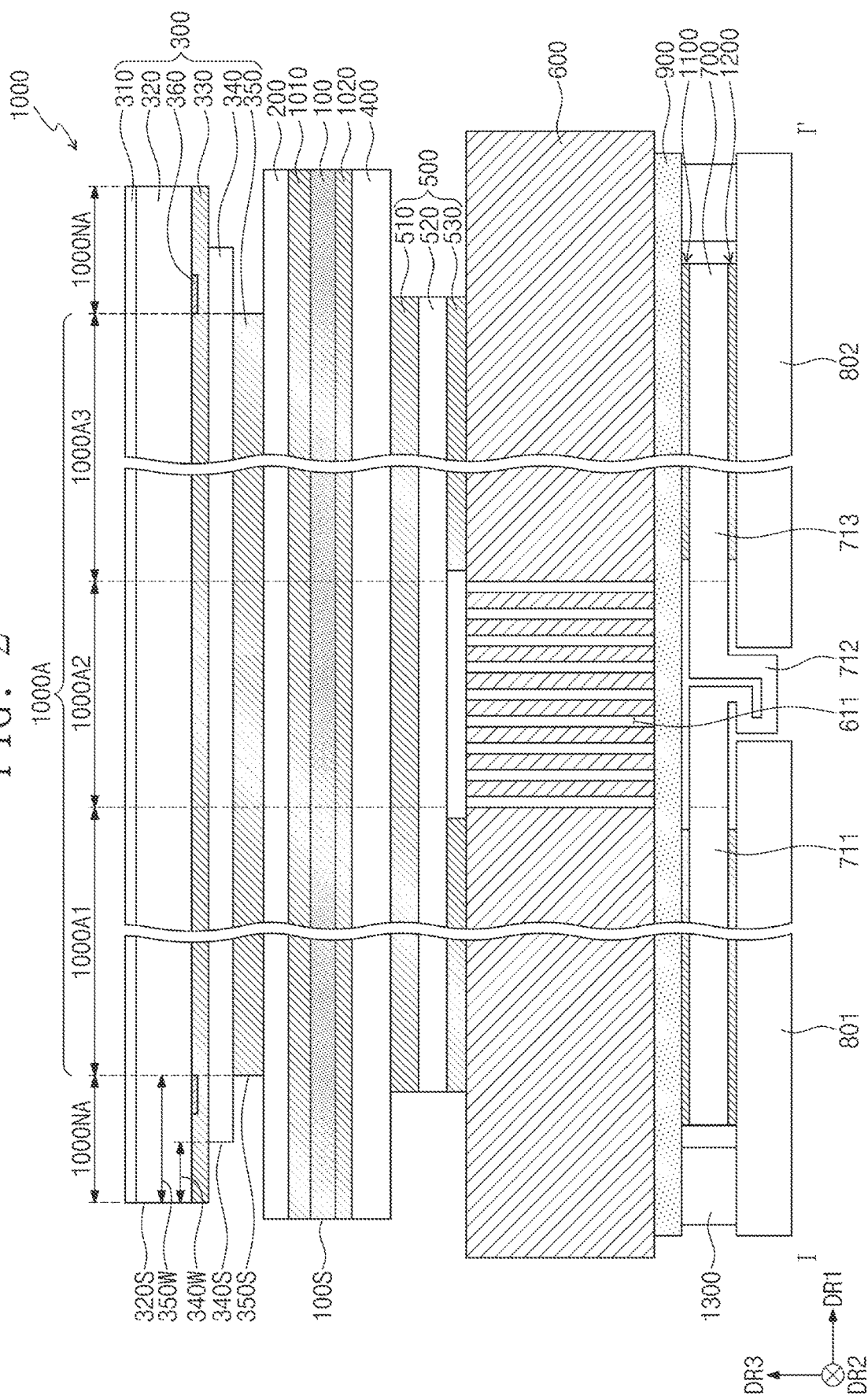
FIG. 2 is a cross-sectional view of an embodiment of the display device.
Figure 3:
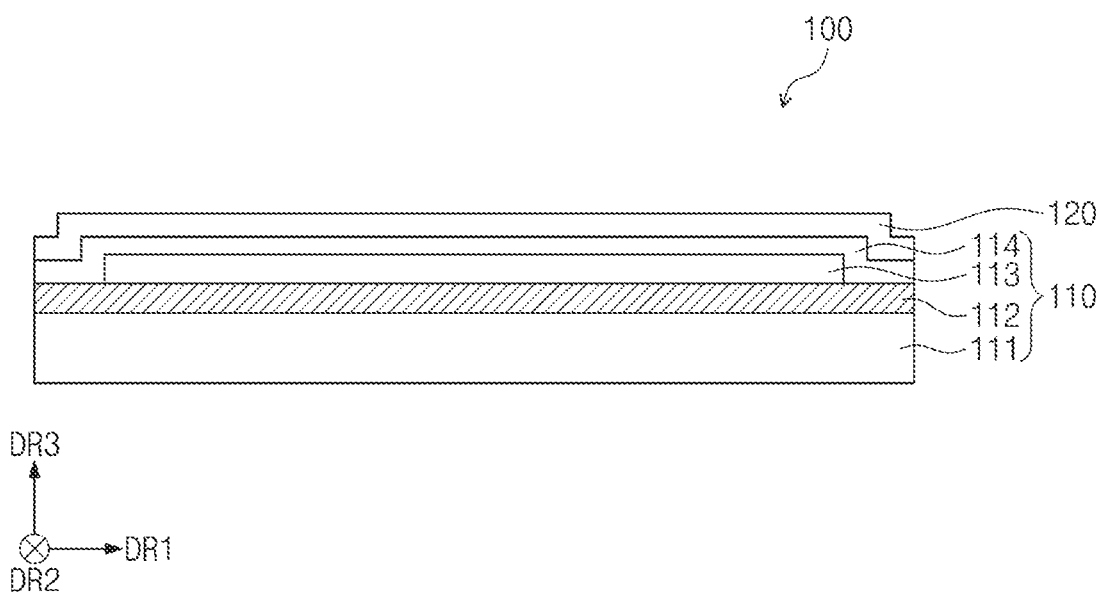
FIG. 3 is a cross-sectional view of an embodiment of a display panel of a display device.

FIG. 2 is a cross-sectional view of an embodiment of the display device 1000. FIG. 2 is a cross-sectional view of the display device 1000 taken along line I-I' of FIG. 1A. FIG. 3 is a cross-sectional view of an embodiment of a display panel 100.

Referring to FIG. 2, the display device 1000 may include a display panel 100, upper functional layers, and lower functional layers.

Referring to FIG. 3, the display panel 100 may be configured to generate an image and sense an input which is applied from outside the display device 1000 and/or the display panel 100. In an embodiment, for example, the display panel 100 may include a display layer 110 and a sensor layer 120. A total thickness of the display panel 100 may be about 25 micrometers to about 35 micrometers, for example, about 30 micrometers, but the thickness of the display panel 100 is not limited thereto.

The display layer 110 may be configured to substantially generate an image. The display layer 110 may be a light-emitting display layer. In an embodiment, for example, the display layer 110 may be an organic light-emitting display layer, a quantum dot display layer, or a micro light-emitting diode (LED) display layer.

The display layer 110 may include a base layer 111, a circuit layer 112, a light-emitting element layer 113, and an encapsulation layer 114.

The base layer 111 may include a synthetic resin layer. The synthetic resin layer may include a thermosetting resin. The base layer 111 may have a multi-layered structure. In an embodiment, for example, the base layer 111 may have a three-layer structure made of (or including) a synthetic resin layer, an adhesive layer, and a synthetic resin layer. In particular, the synthetic resin layer may be a polyimide-based resin layer, and the material thereof is not particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In addition, the base layer 111 may include a glass substrate or an organic/inorganic composite material substrate.

The circuit layer 112 may be disposed on the base layer 111. The circuit layer 112 may include an insulating layer, a semiconductor pattern, a conductive pattern, a signal line, and the like. An insulating layer, a semiconductor layer, and a conductive layer are formed (or provided) on the base layer 111 such as by coating, deposition, and the like, and then, the insulating layer, the semiconductor layer, and the conductive layer may be selectively patterned through a plurality of photolithography processes. Thereafter, the semiconductor pattern, the conductive pattern, and the signal line included in the circuit layer 112 may be formed.

The light-emitting element layer 113 may be disposed on the circuit layer 112. The light-emitting element layer 113 may include a light-emitting element. In an embodiment, for example, the light-emitting element layer 113 may include an organic light-emitting material, a quantum dot, a quantum rod, or a micro LED.

The encapsulation layer 114 may be disposed on the light-emitting element layer 113. The encapsulation layer 114 may include an inorganic layer, an organic layer, and an inorganic layer which are sequentially stacked, but the layers constituting the encapsulation layer 114 are not limited thereto.

The inorganic layers may protect the light-emitting element layer 113 from moisture and oxygen, and the organic layer may protect the light-emitting element layer 113 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, and the embodiment of the invention is not limited thereto.

The sensor layer 120 may be disposed on the display layer 110. The sensor layer 120 may sense an external input applied from outside of the display device 1000 and/or the display panel 100. The external input may an input from an input tool. The input tool may include various types of external inputs, such as a part of a body, light, heat, a pen, or pressure.

The sensor layer 120 may be formed on the display layer 110 through a continuous process. In this case, the sensor layer 120 may be expressed as being directly disposed on the display layer 110. Being directly disposed may mean that a third component is not disposed between the sensor layer 120 and the display layer 110 and/or the sensor layer 120 and the display layer 110 form an interface therebetween. That is, a separate coupling member such as adhesive member may not be disposed between the sensor layer 120 and the display layer 110.

Alternatively, the sensor layer 120 and the display layer 110 may be coupled to each other by a coupling member such as an adhesive member. The adhesive member may include a conventional adhesive or a glue agent.

Referring back to FIG. 2, the upper functional layers may be disposed on the display panel 100. In an embodiment, for example, the upper functional layers may include an anti-reflection member 200 and an upper member 300.

The anti-reflection member 200 may be referred to as an anti-reflection layer. The anti-reflection member 200 may reduce the reflectance of external light incident from outside of the display device 1000 and/or the display panel 100. The anti-reflection member 200 may include a stretchable synthetic resin film. In an embodiment, for example, the anti-reflection member 200 may be provided by dyeing a polyvinyl alcohol film (PVA film) with an iodine compound. However, this is an example, and the material constituting the anti-reflection member 200 is not limited to the above example. The thickness of the anti-reflection member 200 may be about 25 micrometers to about 35 micrometers, for example, about 31 micrometers, but the thickness of the anti-reflection member 200 is not limited thereto.

An embodiment of the anti-reflection member 200 may include color filters. The color filters may have an arrangement. In the anti-reflection member 200, the arrangement of color filters may be determined in consideration of the light-emitting colors of pixels included in the display layer 110. In addition, the anti-reflection member 200 may further include a black matrix adjacent to the color filters.

An embodiment of the anti-reflection member 200 may include a destructive interference structure. In an embodiment, for example, the destructive interference structure may include a first reflective layer and a second reflective layer disposed in different layers from each other. First reflected light and second reflected light reflected respectively from the first and second reflective layers may be destructively interfered with each other and, accordingly, the reflectance of external light may be reduced.

The anti-reflection member 200 may be coupled to the display panel 100 by a first intermediate adhesive layer 1010. The first intermediate adhesive layer 1010 may be a layer including a transparent adhesive material such as a pressure sensitive adhesive (PSA), an optically clear adhesive (OCA), or an optically clear adhesive resin (OCR). The adhesive layer to be described below may include a conventional adhesive or a glue agent. The thickness of the first intermediate adhesive layer 1010 may be about 20 micrometers to about 70 micrometers, for example, about 50 micrometers, but the thickness of the first intermediate adhesive layer 1010 is not limited thereto.

In an embodiment, the first intermediate adhesive layer 1010 may be omitted, and in this case, the anti-reflection member 200 may be directly disposed on the display panel 100. In this case, a separate adhesive layer may not be disposed between the anti-reflection member 200 and the display panel 100.

The upper member 300 may be disposed on the anti-reflection member 200. The upper member 300 may include a hard coating layer 310, a protective layer 320 (also referred to as a protective film), a first upper adhesive layer 330, a window 340, a second upper adhesive layer 350, and a light-blocking pattern 360. Components included in the upper member 300 are not limited to the above-described components. A portion of the above-described components may be omitted, and other components may be added.

The hard coating layer 310 may be a layer which forms an outermost surface of the display device 1000. The hard coating layer 310 is a functional layer for improving the use characteristics of the display device 1000 and may be provided after a hard material is coated on the protective layer 320. In an embodiment, for example, anti-fingerprint properties, anti-contamination properties, anti-scratch properties, and the like may be improved by the hard coating layer 310.

The protective layer 320 may be disposed under the hard coating layer 310. The protective layer 320 may protect components disposed thereunder. A hard coating layer 310, an anti-fingerprint layer, and the like may be additionally provided to the protective layer 320 to improve chemical resistance properties, abrasion resistance properties, and the like. The protective layer 320 may include a film having an elastic modulus of about 15 gigapascals (GPa) or less at room temperature. A thickness of the protective layer 320 may be about 50 micrometers to about 70 micrometers, for example, about 65 micrometers, but the thickness of the protective layer 320 is not limited thereto. In an embodiment, the protective layer 320 may be omitted. Although not specifically illustrated, the protective layer 320 may have a structure in which a plurality of films are stacked. The protective layer 320 may include a plurality of synthetic resin films bonded together with an adhesive.

The first upper adhesive layer 330 may be disposed under the protective layer 320. The protective layer 320 and the window 340 may be coupled to each other by the first upper adhesive layer 330. A thickness of the first upper adhesive layer 330 may be about 20 micrometers to about 50 micrometers, for example, about 35 micrometers, but the thickness of the first upper adhesive layer 330 is not limited thereto.

The window 340 may be disposed under the first upper adhesive layer 330. The window 340 may include an optically transparent insulating material. In an embodiment, for example, the window 340 may include a glass substrate or a synthetic resin film. When the window 340 is a glass substrate, the window 340 may be a thin glass substrate having a thickness of about 80 micrometers or less. In an embodiment, for example, the thickness of the window 340 may be about 31 micrometers, but the thickness of the window 340 is not limited thereto.

When the window 340 is a synthetic resin film, the window 340 may include a polyimide (PI) film or a polyethylene terephthalate (PET) film.

The window 340 may have a multi-layered structure or a single-layered structure. In an embodiment, for example, the window 340 may include a plurality of synthetic resin films bonded together such as with an adhesive, or may include a glass substrate and a synthetic resin film bonded together such as with an adhesive.

The second upper adhesive layer 350 may be disposed under the window 340. The window 340 and the anti-reflection member 200 may be coupled to each other by the second upper adhesive layer 350. A thickness of the second upper adhesive layer 350 may be about 30 micrometers to about 70 micrometers, for example, about 50 micrometers, but the thickness of the second upper adhesive layer 350 is not limited thereto.

In an embodiment, a window sidewall 340S of the window 340 and a second adhesive layer sidewall 350S of the second upper adhesive layer 350 may be disposed further inside the display device 1000 than sidewalls of other layers, for example, a display panel sidewall 100S of the display panel 100 and a protective layer sidewall 320S of the protective layer 320. Being disposed inside may mean being closer to the active region 1000A relative to other objects.

When the display device 1000 is folded, positional relationships between respective layers may be changed. According to an embodiment, since the window sidewall 340S of the window 340 is disposed inside the display panel sidewall 100S of the display panel 100 and the protective layer sidewall 320S of the protective layer 320 within the display device 1000 which is unfolded, a probability that the window sidewall 340S of the window 340 protrudes more than the protective layer sidewall 320S of the protective layer 320 may be reduced even though the positional relationships between the respective layers are changed. Accordingly, a possibility that an external impact is transmitted through the window sidewall 340S of the window 340 may be reduced. As a result, a probability that the window 340 is cracked may be reduced.

A first distance 340W between the window sidewall 340S of the window 340 and the protective layer sidewall 320S of the protective layer 320 may be greater than or equal to a reference distance. Here, the first distance 340W may mean a distance in a direction parallel to the first direction DR1. In addition, when viewed on a plane (e.g., along the third direction DR3), the first distance 340W may correspond to a distance between an outer side surface of the window sidewall 340S and an outer side surface of the protective layer sidewall 320S.

The first distance 340W may be about 180 micrometers to about 250 micrometers, for example, about 210 micrometers, but is not limited thereto. In an embodiment, for example, the first distance 340W may be about 50 micrometers or more, or about 300 micrometers. As the first distance 340W becomes greater, the protective layer 320 protrudes further from the active region 1000A than the window 340, and a portion of the protective layer 320 may be bent so as to be attached to other components, for example, a case or the like. In addition, as the area of the protective layer 320 (e.g., planar area along the plane defined by the first direction DR1 and the second direction DR2 which cross each other) becomes greater, a probability that a foreign material from the top of the protective layer 320 is introduced into the bottom of the protective layer 320 may be reduced.

In addition, the window 340 and the second upper adhesive layer 350 may be adhered to the anti-reflection member 200 through a lamination process. In consideration of a lamination process tolerance, the areas of the window 340 and the second upper adhesive layer 350 may be smaller than the area of the anti-reflection member 200. In addition, the area of the second upper adhesive layer 350 may be smaller than the area of the window 340. In the process of attaching the window 340, pressure may be applied to the second upper adhesive layer 350. Because of the applied pressure, the second upper adhesive layer 350 may be stretched in a direction parallel to the first direction DR1 and the second direction DR2. In this case, the area of the second upper adhesive layer 350 may be smaller than the area of the window 340 so that the second upper adhesive layer 350 does not protrude more than the window 340.

When the first upper adhesive layer 330 and the second upper adhesive layer 350 are attached to each other, a buckling phenomenon may occur in the window 340 because the window 340 may not slip when the display device 1000 is folded. According to an embodiment, however, since the area of the second upper adhesive layer 350 is smaller than the area of the window 340, the first upper adhesive layer 330 may not be attached to the second upper adhesive layer 350, and a probability that a foreign material adheres to the second upper adhesive layer 350 may be reduced.

A second distance 350W between the second adhesive layer sidewall 350S of the second upper adhesive layer 350 and the protective layer sidewall 320S of the protective layer 320 may be greater than or equal to a reference distance. Here, the second distance 350W may mean a distance in a direction parallel to the first direction DR1. In addition, when viewed on a plane, the second distance 350W may correspond to a distance between the second adhesive layer sidewall 350S and the protective layer sidewall 320S.

The second distance 350W may be about 408 micrometers, but is not limited thereto. In an embodiment, for example, the second distance 350W may be selected from a range between about 292 micrometers and about 492 micrometers, but is not limited thereto.

The light-blocking pattern 360 may be disposed under the protective layer 320. The light-blocking pattern 360 may be provided by being provided on the lower surface of the protective layer 320 such as by printing, and may be covered by the first upper adhesive layer 330. The light-blocking pattern 360 may overlap the non-active region 1000NA. The light-blocking pattern 360 may be disposed adjacent to the edge of the protective layer 320 (e.g., outer side surface). The light-blocking pattern 360 may be formed by a coating method as a colored layer. The light-blocking pattern 360 may include a colored organic material or an opaque metal, but the material constituting the light-blocking pattern 360 is not limited thereto.

FIG. 2 exemplarily illustrates that the light-blocking pattern 360 is disposed on the lower surface of the protective layer 320, but the position of the light-blocking pattern 360 is not limited thereto. In an embodiment, for example, the light-blocking pattern 360 may be provided on the upper surface of the protective layer 320, the upper surface of the window 340, or the lower surface of the window 340. In addition, the light-blocking pattern 360 may be provided as a plurality of layers. In this case, a portion of the light-blocking patterns 360 may be provided on the lower surface of the protective layer 320, and others may be provided on the upper surface of the protective layer 320, the upper surface of the window 340, or the lower surface of the window 340.

Although not illustrated, the upper member 300 may further include a shock-absorbing layer and/or a lower hard coating layer which are disposed under the second upper adhesive layer 350.

The shock-absorbing layer may be a functional layer for protecting the display panel 100 from an external shock. The shock-absorbing layer may be selected from films having an elastic modulus of about 1 gigapascal (GPa) or more at room temperature. In an embodiment, the shock-absorbing layer may be omitted.

The lower hard coating layer may be provided on the surface of the shock-absorbing layer. The shock-absorbing layer may include a curved surface. The upper surface of the shock-absorbing layer may be in contact with the second upper adhesive layer 350. As being in contact, elements may form an interface therebetween, without being limited thereto. Accordingly, the curved portion of the upper surface of the shock-absorbing layer may be filled with the second upper adhesive layer 350, and an optical issue may not occur on the upper surface of the shock-absorbing layer. The lower surface of the shock-absorbing layer may be flattened by the lower hard coating layer. As the lower hard coating layer covers the curved portion of the lower surface of the shock-absorbing layer, haze which may be generated on the lower surface of the shock-absorbing layer may be prevented.

Lower functional layers may be disposed under the display panel 100. In an embodiment, for example, the lower functional layers may include a lower protective film 400, a barrier member 500, a first plate 600, a heat dissipation layer 700, and a second plate 800. Components included in the lower functional layers are not limited to the above-described components. A portion of the above-described components may be omitted, and other components may be added.

The lower protective film 400 may be coupled to the rear surface of the display panel 100 by a second intermediate adhesive layer 1020. The lower protective film 400 may prevent a scratch on the rear surface of the display panel 100 such as during a manufacturing process of the display panel 100. The lower protective film 400 may be a polyimide (PI) film or a polyethylene terephthalate (PET) film. The lower protective film 400 may be a colored film. In an embodiment, for example, the lower protective film 400 may be an opaque yellow film, but is not limited thereto.

A thickness of the lower protective film 400 may be about 40 micrometers to about 80 micrometers, for example, about 50 micrometers. A thickness of the second intermediate adhesive layer 1020 may be about 15 micrometers to about 30 micrometers, for example, about 25 micrometers. However, the thickness of the lower protective film 400 and the thickness of the second intermediate adhesive layer 1020 are not limited thereto.

The barrier member 500 may be disposed under the lower protective film 400. The barrier member 500 may include a barrier layer 520, an upper barrier adhesive layer 510, and a lower barrier adhesive layer 530.

The barrier layer 520 may improve the resistance to compressive strength which may be caused by external pressing. Accordingly, the barrier layer 520 may serve to reduce or effectively prevent deformation of the display panel 100. The barrier layer 520 may include a flexible plastic material such as polyimide or polyethylene terephthalate.

The barrier layer 520 may have a color that absorbs light. The barrier layer 520 may have a black color. In this case, when the display panel 100 is viewed from above the display panel 100, components disposed under the barrier layer 520 may not be visually recognized.

The barrier layer 520 may be coupled to the rear surface of the lower protective film 400 by the upper barrier adhesive layer 510. The barrier layer 520 may be coupled to the upper surface of the first plate 600 by the lower barrier adhesive layer 530. Each of the upper barrier adhesive layer 510 and the lower barrier adhesive layer 530 may include a transparent adhesive such as a pressure sensitive adhesive (PSA), an optically clear adhesive (OCA), and an optically clear adhesive resin (OCR), but the types of adhesive are not limited thereto.

In an embodiment, the lower barrier adhesive layer 530 may not be disposed in a region in which openings 611 are provided in plural, and a plurality of openings 611 are defined in the first plate 600. That is, the lower barrier adhesive layer 530 may be disconnected at the second region 1000A2 and include a portion overlapping the first region 1000A1 and a portion overlapping the third region 1000A3. The disconnected portions of the lower barrier adhesive layer 530 may be spaced apart from each other with a gap or space therebetween which corresponds to the region having the openings 611. The lower barrier adhesive layer 530 may not be disposed in the second region 1000A2. However, without being limited thereto, the lower barrier adhesive layer 530 may also be disposed in the second region 1000A2, or the lower barrier adhesive layer 530 may have a shape curved in an upward direction so that the lower barrier adhesive layer 530 does not come in contact with the portion of the first plate 600 in which the openings 611 are defined.

A thickness of the barrier layer 520 may be about 20 micrometers to about 50 micrometers, for example, about 35 micrometers. A thickness of the upper barrier adhesive layer 510 may be about 15 micrometers to about 30 micrometers, for example, about 25 micrometers. A thickness of the lower barrier adhesive layer 530 may be about 10 micrometers to about 20 micrometers, for example, about 16 micrometers. However, the thickness of the barrier layer 520, the thickness of the upper barrier adhesive layer 510, and the thickness of the lower barrier adhesive layer 530 are not limited thereto.

The first plate 600 may be disposed under the barrier member 500. The first plate 600 may include a material having an elastic modulus of about 60 GPa or more at room temperature. The first plate 600 may include metal. The first plate 600 may include a single-metal material or an alloy of a plurality of metal materials. In an embodiment, for example, the first plate 600 may include stainless steel (SUS304). However, without being limited thereto, the first plate 600 may include various metal materials. The first plate 600 may be configured to support components disposed thereabove, for example, the display panel 100. In addition, the heat dissipation performance of the display device 1000 may be improved by the first plate 600.

A portion of the first plate 600 may have the openings 611 defined therein. Solid portions of the first plate 600 may be spaced apart from each other to define the opening 611. The openings 611 may be defined in a region overlapping the second region 1000A2 of the active region 1000A. The portion of the first plate 600 in which the openings 611 are defined may be referred to as a plate folding portion. When viewed along the third direction DR3, the openings 611 may overlap the second region 1000A2. The shape of the plate folding portion of the first plate 600 may be more easily changed by the openings 611. FIG. 2 exemplarily illustrates that a plurality of openings 611 are defined in a portion of the first plate 600. However, without being limited thereto, the plate folding portion may be defined including a gap in an entirety of the region of the first plate 600 which overlaps the second region 1000A2. The openings 611 may be provided in a plurality of rows on a plane. The rows may extend along the second direction DR2 while being spaced apart along the first direction DR1. The openings 611 may be provided in a plurality of rows arranged so as to be offset from each other on a plane.

The lower functional layers may further include a cover layer 900 which is disposed under the first plate 600. The cover layer 900 may be disposed directly under the first plate 600. Alternatively, the cover layer 900 may be attached under the first plate 600 such as by an adhesive layer. The cover layer 900 may cover the openings 611 of the first plate 600. Accordingly, it is possible to additionally reduce or effectively prevent a foreign material from being introduced into the openings 611 from outside the display device 1000.

The cover layer 900 may include a material having a lower elastic modulus than the first plate 600. The cover layer 900 may be a flexible film. The cover layer 900 may include a material having an elastic modulus of about 30 megapascals (MPa) or less and an elongation ratio of about 100% or more at room temperature. In an embodiment, for example, the cover layer 900 may include any one of an acrylic-based resin, a methacrylic-based resin, a polyisoprene-based resin, a vinyl-based resin, an epoxy-based resin, an urethane-based resin, a cellulose-based resin, a siloxane-based resin, a polyimide-based resin, a polyamide-based resin, and a perylene-based resin. In an embodiment, for example, the cover layer 900 may include thermoplastic polyurethane. The cover layer 900 may be a thermoplastic polyurethane film having a mesh pattern formed thereon. The cover layer 900 may be manufactured in the form of a sheet and attached under the first plate 600.

A thickness of the first plate 600 may be about 120 micrometers to about 180 micrometers, for example, about 150 micrometers. A thickness of the cover layer 900 may be about 10 micrometers to about 20 micrometers, for example, about 16 micrometers. However, the thickness of the first plate 600 and the thickness of the cover layer 900 are not limited to the above-described numerical values.

The second plate 800 may be disposed under the first plate 600. The second plate 800 may include a plurality of sub-plates. One of the plurality of sub-plates may be disposed so as to overlap the first region 1000A1 and a portion of the second region 1000A2, and the other sub-plate may be disposed so as to overlap another portion of the second region 1000A2 and the third region 1000A3.

The second plate 800 may be disconnected at the second region 1000A2 and include a first sub-plate 801 and a second sub-plate 802. The first sub-plate 801 may be disposed so as to overlap a portion of the second region 1000A2 and the first region 1000A1, and the second sub-plate 802 may be disposed so as to overlap another portion of the second region 1000A2 and the third region 1000A3.

The first sub-plate 801 and the second sub-plate 802 may be disposed to be spaced apart from each other at the second region 1000A2. However, the first sub-plate 801 and the second sub-plate 802 may be disposed close to each other along the thickness direction to support a region in which the openings 611 of the first plate 600 are formed. In an embodiment, for example, portions of the first sub-plate 801 and the second sub-plate 802 overlapping the second region 1000A2 may reduce or effectively prevent deformation of the shape of the region which defines the openings 611 of the first plate 600, by pressure applied from above.

The second plate 800 may serve to reduce or effectively prevent the shapes of components disposed above the second plate 800 from being deformed by a configuration disposed under the second plate 800, for example, by a configuration of a set member and the like. In addition, the heat dissipation performance of the display device 1000 may be improved by the second plate 800.

The second plate 800 may include a metal alloy. In an embodiment, for example, the second plate 800 may include a copper alloy. However, the material constituting the second plate 800 is not limited thereto. Each of the sub-plates within the second plate 800 may have a thickness of about 30 micrometers to about 70 micrometers, for example, about 50 micrometers, but the thickness of sub-plates and/or the second plate 800 is not limited thereto.

The heat dissipation layer 700 may be disposed between the first plate 600 and the second plate 800. The heat dissipation layer 700 may be disposed under the cover layer 900. The heat dissipation layer 700 may be disposed between the cover layer 900 and the second plate 800.

A first adhesive layer 1100 may be disposed between the heat dissipation layer 700 and the first plate 600. A second adhesive layer 1200 may be disposed between the heat dissipation layer 700 and the second plate 800. The first adhesive layer 1100 may be disposed between the heat dissipation layer 700 and the cover layer 900. The first adhesive layer 1100 may be in contact with the lower surface of the cover layer 900 which is furthest from the display panel 100 and the upper surface of the heat dissipation layer 700 which is closest to the display panel 100. The second adhesive layer 1200 may be in contact with the lower surface of the heat dissipation layer 700 which is furthest from the display panel 100 and the upper surface of the second plate 800 which is closest to the display panel 100.

The first adhesive layer 1100 may be disposed under the cover layer 900 and may include a plurality of sub-adhesive layers (e.g., adhesive layer patterns) spaced apart from each other. A gap between the plurality of sub-adhesive layers included in the first adhesive layer 1100 may overlap the second region 1000A2. More specifically, the first adhesive layer 1100 may include a first sub-adhesive layer overlapping the first region 1000A1 and a second sub-adhesive layer overlapping the third region 1000A3, and the first sub-adhesive layer and the second sub-adhesive layer may be spaced apart from each other along the first direction DR1 with the gap therebetween. The gap between the first sub-adhesive layer and the second sub-adhesive layer may be defined to partially overlap the second region 1000A2. The gap between the first sub-adhesive layer and the second sub-adhesive layer may be greater than the width of the second region 1000A2, where the gap and width are taken along the first direction DR1.

The second adhesive layer 1200 may be disposed under the heat dissipation layer 700 and may include a plurality of sub-adhesive layers spaced apart from each other. A gap between the plurality of sub-adhesive layers included in the second adhesive layer 1200 may overlap the second region 1000A2. More specifically, the second adhesive layer 1200 may include a third sub-adhesive layer overlapping the first region 1000A1 and a fourth sub-adhesive layer overlapping the third region 1000A3, and the third sub-adhesive layer and the fourth sub-adhesive layer may be spaced apart from each other along the first direction DR1 with the gap therebetween. The gap between the third sub-adhesive layer and the fourth sub-adhesive layer may be defined to partially overlap the second region 1000A2. The gap between the third sub-adhesive layer and the fourth sub-adhesive layer may be greater than the width of the second region 1000A2, where the gap and width are taken along the first direction DR1.

The heat dissipation layer 700 may perform a heat dissipation function. The heat dissipation layer 700 may be a thermal conductive layer having high thermal conductivity. In an embodiment, for example, the heat dissipation layer 700 may include graphite, but the material of the heat dissipation layer 700 is not limited thereto. As the heat dissipation layer 700 performs a heat dissipation function together with the first plate 600 and the second plate 800, the heat dissipation performance of the display device 1000 may be improved.

The heat dissipation layer 700 may overlap an entirety of each of the first region 1000A1, the second region 1000A2, and the third region 1000A3. At least a portion of the heat dissipation layer 700 may overlap the second region 1000A2. As the heat dissipation layer 700 has an integral shape overlapping each of the first region 1000A1, the second region 1000A2, and the third region 1000A3, the heat dissipation performance may be further improved.

The heat dissipation layer 700 may include a first heat dissipation portion 711, a second heat dissipation portion 712, and a third heat dissipation portion 713. The first heat dissipation portion 711 may overlap the first region 1000A1, the second heat dissipation portion 712 may overlap the second region 1000A2, and the third heat dissipation portion 713 may overlap the third region 1000A3.

A portion of the second heat dissipation portion 712 may have a bent shape. As the second heat dissipation portion 712 defines the bent shape of the second heat dissipation portion 712, the bent portion may be disposed between the first sub-plate 801 and the second sub-plate 802. The bent portion of the second heat dissipation portion 712 may have a smaller thickness than other portions of the second heat dissipation portion 712. As an example, the bent portion of the second heat dissipation portion 712 may be bent twice in a downward direction along the thickness direction and in a left direction along a plane direction, as illustrated in FIG. 2, but the bent shape of the second heat dissipation portion 712 is not limited thereto. The display device 1000 which is unfolded or flat includes a portion of the second heat dissipation portion 712 which is bent. The display device 1000 which is folded includes a portion of the second heat dissipation portion 712 which is unfolded or flat. That is, a total dimension of the heat dissipation layer 700 which is taken along the first direction DR1 is changeable by folding and unfolding of the display device 1000. As a portion of the second heat dissipation portion 712 has a bent shape as an original shape, the area of the heat dissipation layer 700 defined by the dimension along the first direction DR1 increases in folding or bending of the display device 1000, thus improving heat dissipation performance, while damage to the second heat dissipation portion 712 due to folding or bending thereof may be reduce or effectively prevented. Although FIG. 2 exemplarily illustrates that the heat dissipation layer 700 has a bent shape as an original shape, the invention is not limited thereto and the original shape of the heat dissipation layer 700 may be variously changed without limitation as long as the shape is suitable for performing a folding operation.

A thickness of the heat dissipation layer 700 may be about 20 micrometers to about 40 micrometers, for example, about 31 micrometers. Each of the first adhesive layer 1100 and the second adhesive layer 1200 may have a thickness of about 1 micrometer to about 10 micrometers, for example, about 4 micrometers. However, the thickness of the heat dissipation layer 700 and the thickness of each of the first adhesive layer 1100 and the second adhesive layer 1200 are not limited to the above-described numerical values.

The lower functional layer may further include a step compensation layer 1300 disposed under the first plate 600. The step compensation layer 1300 may be disposed under the cover layer 900. The step compensation layer 1300 may be disposed between the cover layer 900 and the second plate 800.

The step compensation layer 1300 may be disposed to be spaced apart from the heat dissipation layer 700 along the first direction DR1. The step compensation layer 1300 may be disposed around the edge of the heat dissipation layer 700 and around the edge of each of the first adhesive layer 1100 and the second adhesive layer 1200. The step compensation layer 1300 may include a double-sided tape. The adhesive strength of one surface of the step compensation layer 1300 may be lower than the adhesive strength of the other surface thereof which opposes the one surface. In an embodiment, for example, one surface of the step compensation layer 1300 may not have adhesive strength.

The heat dissipation layer 700, the first adhesive layer 1100, and the second adhesive layer 1200 may be disposed inside the edge of the cover layer 900 and the edge of the second plate 800 in a plan view. The step compensation layer 1300 is disposed adjacent to the corresponding outer edges of the cover layer 900 and the second plate 800 at which the heat dissipation layer 700, the first adhesive layer 1100, and the second adhesive layer 1200 are not disposed. The step compensation layer 1300 may compensate for a step difference at a portion in which the heat dissipation layer 700, the first adhesive layer 1100, and the second adhesive layer 1200 are not disposed. A thickness of the step compensation layer 1300 may be substantially equal to the sum of the thicknesses of the heat dissipation layer 700, the first adhesive layer 1100, and the second adhesive layer 1200. As used in this specification, being "substantially the same" in thickness, width, and gap may include not only a case in which the thickness, width, and gap are physically identical, but also a case in which the thickness, width, and gap are the same in design, but are somewhat different due to an error that may occur in a process.

Figure 4:
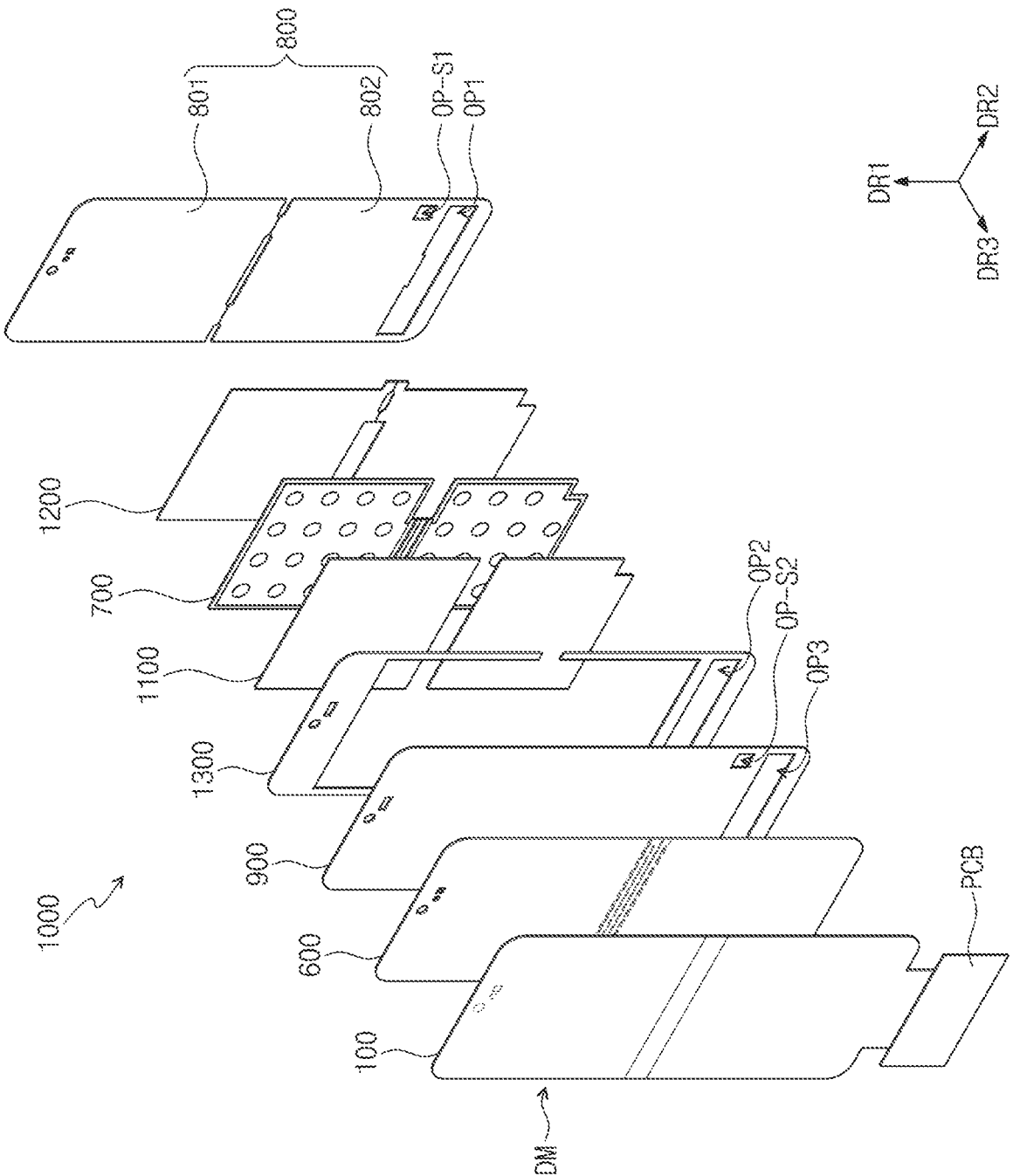
FIG. 4 is an exploded perspective view of an embodiment of the display device.
Figure 5:
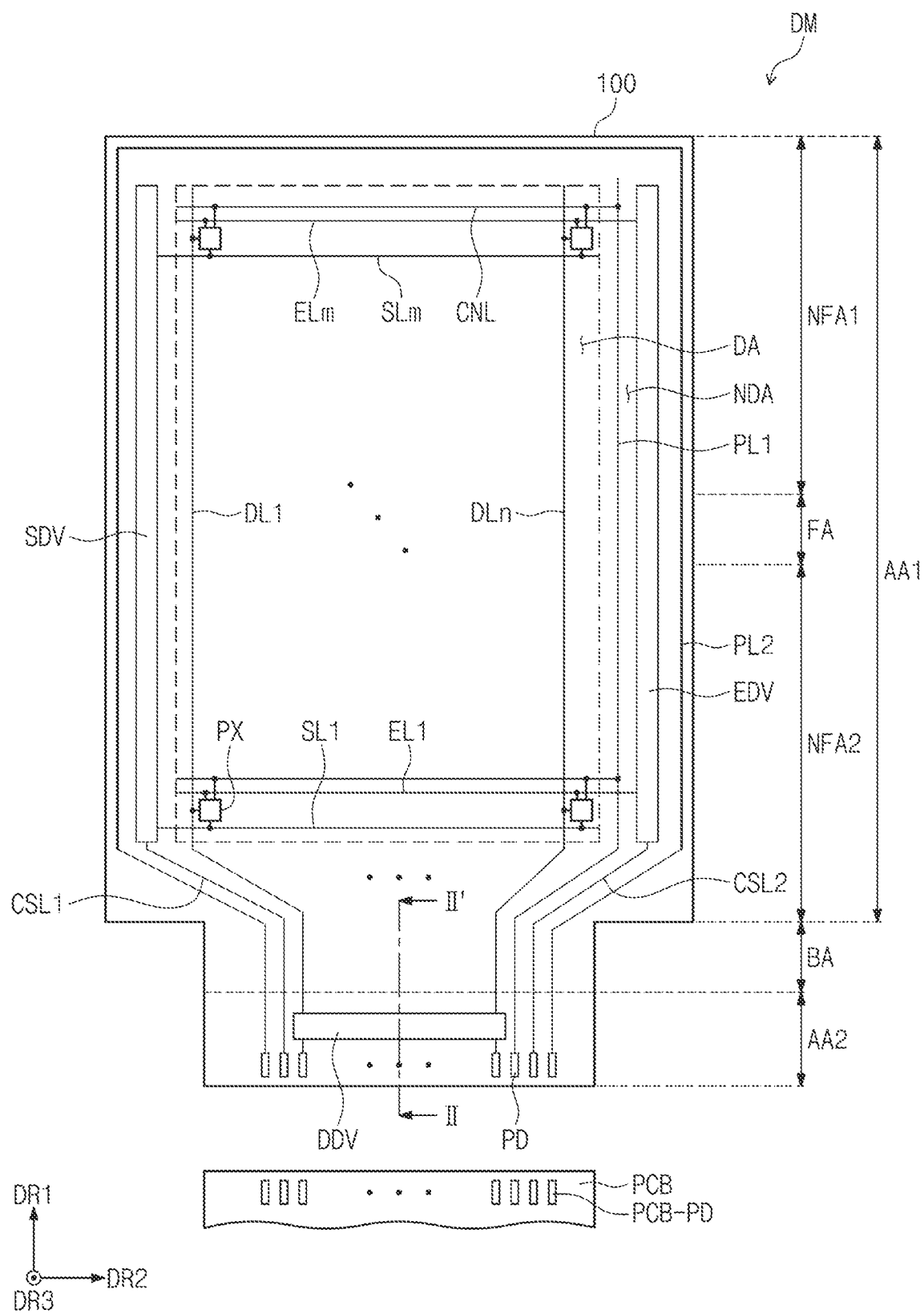
FIG. 5 is a plan view of an embodiment of a display module of a display device.

FIG. 4 is an exploded perspective view of an embodiment of the display device 1000. FIG. 5 is a plan view of an embodiment of a display module DM of the display device 1000.

Referring to FIGS. 2 and 4 together, the display device 1000 may include a display module DM including a display panel 100, and a first plate 600, a cover layer 900, a step compensation layer 1300, a first adhesive layer 1100, a heat dissipation layer 700, a second adhesive layer 1200, and a second plate 800 in order in a direction away from the display panel 100.

The display module DM may include the display panel 100 and a printed circuit board PCB which is connected to the display panel 100. The printed circuit board PCB may be connected to a short side end of the display panel 100.

The second plate 800 may have a first opening OP1 defined therein. The second plate 800 may include a first sub-plate 801 and a second sub-plate 802, and the first opening OP1 may be defined in any one of the first sub-plate 801 and the second sub-plate 802. In an embodiment, the first opening OP1 may be defined in the second sub-plate 802. On a plane, the second sub-plate 802 may overlap an end of the display panel 100 at which the printed circuit board PCB is connected to the display panel 100.

The heat dissipation layer 700 is disposed between the first plate 600 and the second plate 800. The heat dissipation layer 700 may be disposed under the cover layer 900, the first adhesive layer 1100 may be disposed on the heat dissipation layer 700, and the second adhesive layer 1200 may be disposed under the heat dissipation layer 700. At least a portion of the heat dissipation layer 700 may overlap the second region 1000A2. The heat dissipation layer 700 may have an integral shape overlapping each of the first region 1000A1, the second region 1000A2, and the third region 1000A3. As illustrated in FIG. 4, the heat dissipation layer 700 may have a shape in which a portion thereof has a reduced width along the second direction DR2. In an embodiment, for example, a portion of the heat dissipation layer 700 overlapping the second region 1000A2 may have a width along the second direction DR2 which is smaller than widths of remaining portions of the heat dissipation layer 700 (e.g., at the first region 1000A1 and the third region 1000A3).

Each of the heat dissipation layer 700, the first adhesive layer 1100, and the second adhesive layer 1200 may be disposed inside the edge of the cover layer 900 and the edge of the second plate 800, in the plan view. The step compensation layer 1300 may be disposed adjacent to the edges of the cover layer 900 and the second plate 800 at which the heat dissipation layer 700, the first adhesive layer 1100, and the second adhesive layer 1200 are not disposed. As each of the heat dissipation layer 700, the first adhesive layer 1100, and the second adhesive layer 1200 is disposed inside the edge of the second plate 800, each of the heat dissipation layer 700, the first adhesive layer 1100, and the second adhesive layer 1200 may not overlap the first opening OP1, on a plane. Elements or features which do not overlap along a thickness direction may be adjacent to each other and/or be spaced apart from each other along a plane.

The step compensation layer 1300 may have a second opening OP2 defined therein. At least a portion of the second opening OP2 may be defined to overlap the first opening OP1, on a plane, which is defined in the second plate 800. The shape and size of the second opening OP2 on a plane may be substantially the same as those of the first opening OP1. However, without being limited thereto, on a plane, one portion of the second opening OP2 may overlap the first opening OP1 and another portion thereof may not overlap the first opening OP1.

The cover layer 900 may have a third opening OP3 defined therein. At least a portion of the third opening OP3 may be defined to overlap the first opening OP1, on a plane, which is defined in the second plate 800. At least a portion of the third opening OP3 may be defined to overlap the second opening OP2, on a plane, which is defined in the step compensation layer 1300. The shape and size of the third opening OP3 on a plane may be substantially the same as those of the first opening OP1. However, the invention is not limited thereto, and on a plane, one portion of the third opening OP3 may overlap the first opening OP1, and the other portion thereof may not overlap the first opening OP1.

The first opening OP1, the second opening OP2, and the third opening OP3 may correspond to or be aligned with each other to provide a single opening. A portion of the lower surface of the first plate 600 may be exposed to outside of the second plate 800, the step compensation layer 1300, and the cover layer 900, by the first opening OP1, the second opening OP2, and the third opening OP3 together with each other. A dummy tape, a contact part, and the like may be disposed on the lower surface of the first plate 600 which is exposed to outside the display module DM by the first opening OP1, the second opening OP2, and the third opening OP3 together with each other. As the first opening OP1, the second opening OP2, and the third opening OP3 are defined, components such as the dummy tape and the contact part disposed on the lower surface of the first plate 600 may be exposed to outside the display module DM, and a portion of the printed circuit board PCB which are external to the display module DM may come in contact with the dummy tape, the contact part, and the like. A detailed description of this will be given later in the description of FIGS. 6A to 6C.

The second plate 800 may have a first additional opening OP-S1 defined therein. The second plate 800 may include a first sub-plate 801 and a second sub-plate 802, and any one of the first sub-plate 801 and the second sub-plate 802 may have the first additional opening OP-S1 defined therein. In an embodiment, the second sub-plate 802 may have the first additional opening OP-S1 defined therein. Each of the heat dissipation layer 700, the first adhesive layer 1100, the second adhesive layer 1200, and the step compensation layer 1300 may not overlap the first additional opening OP-S1 on a plane.

The cover layer 900 may have a second additional opening OP-S2 defined therein. At least a portion of the second additional opening OP-S2 may be defined to overlap (or be aligned with) the first additional opening OP-S1, on a plane, which is defined in the second plate 800. The shape and size of the second additional opening OP-S2 on a plane may be substantially the same as those of the first additional opening OP-S1. However, without being limited thereto, on a plane, one portion of the second additional opening OP-S2 may overlap the first additional opening OP-S1, and the other portion thereof may not overlap the first additional opening OP-S1.

Although not illustrated, a portion of the lower surface of the first plate 600 may be exposed to outside the display module DM by the first additional opening OP-S1 and the second additional opening OP-S2. A cell identification (cell ID) layer may be disposed on the lower surface of the first plate 600 which is exposed to outside the display module DM by the first additional opening OP-S1 and the second additional opening OP-S2 together with each other. As the first additional opening OP-S1 and the second additional opening OP-S2 are defined, the cell ID layer disposed on the lower surface of the first plate 600 may be exposed to outside the display module DM when viewed from under the display device 1000. Therefore, an identification number of a product may be indicated by the cell ID layer such as during a process of manufacturing or providing the display device 1000.

Referring to FIG. 4, at least one hole overlapping each of the first sensing region 100SA1, the second sensing region 100SA2, and the third sensing region 100SA3 of FIG. 1A may be defined in each of the first plate 600 and the second plate 800. Further referring to FIG. 4, at least one hole may also be defined in each of the cover layer 900 and the step compensation layer 1300. Solid portions of the various plates and layers may define the openings and holes described above. A single one hole may be provided to overlap a plurality of regions among the first sensing region 100SA1, the second sensing region 100SA2, and the third sensing region 100SA3. Each of the heat dissipation layer 700, the first adhesive layer 1100, and the second adhesive layer 1200 may not overlap the various holes which are described above.

Referring to FIG. 5, the display module DM may include a display panel 100, a scan driver SDV, a data driver DDV, and a light-emitting driver EDV.

The display panel 100 may be a light-emitting display panel, but the invention is not particularly limited thereto. In an embodiment, for example, the display panel 100 may be an organic light-emitting display panel or an inorganic light-emitting display panel. The light-emitting layer of the organic light-emitting display panel may include an organic light-emitting material. The light-emitting layer of the inorganic light-emitting display panel may include quantum dots and quantum rods. Hereinafter, the display panel 100 will be described as an organic light-emitting display panel.

The display panel 100 may be flexible to be foldable, bendable, rollable, etc. In an embodiment, for example, the display panel 100 may include a plurality of electronic elements disposed on a flexible substrate. The display panel 100 may extend longer in the first direction DR1 than in the second direction DR2. The display panel 100 which is unfolded or flat may be disposed in or parallel to a plane defined by the first direction DR1 and the second direction DR2.

The display panel 100 may include a first panel region AA1, a second panel region AA2, and a bending region BA disposed between the first panel region AA1 and the second panel region AA2. The bending region BA may extend in the second direction DR2, and the first panel region AA1, the bending region BA, and the second panel region AA2 may be sequentially arranged along the first direction DR1.

The first panel region AA1 may have long sides that extend in the first direction DR1 and are spaced apart from each other along the second direction DR2, thus facing each other. Based on the second direction DR2, the lengths of the bending region BA and the second panel region AA2 may be smaller than the length of the first panel region AA1.

The first panel region AA1 may include a display region DA and a non-display region NDA which is adjacent to the display region DA. In an embodiment, the non-display region NDA may surround the display region DA. The display region DA may be a region in which an image is displayed, and the non-display region NDA may be a region in which an image is not displayed. The second panel region AA2 and the bending region BA may be regions in which an image is not displayed. The non-display region NDA together with the second panel region AA2 and the bending region BA may provide a non-display area of the display panel 100. The display region DA may correspond to the active region 1000A of the display device 1000 illustrated in FIG. 2. The non-display region NDA may correspond to the non-active region 1000NA of the display device 1000 illustrated in FIG. 2.

The first panel region AA1 may include a first non-folding region NFA1, a second non-folding region NFA2, and a folding region FA between the first non-folding region NFA1 and the second non-folding region NFA2. The first non-folding region NFA1 may correspond to the first region 1000A1 of the display device 1000 illustrated in FIG. 2, the second non-folding region NFA2 may correspond to the third region 1000A3 of the display device 1000, and the folding region FA may correspond to the second region 1000A2 of the display device 1000. The display panel 100 may be foldable or bendable together with other components or layers of the display device 1000, at the folding region FA.

The display panel 100 may include a pixel PX provided in plural including a plurality of pixels PX, a plurality of scan lines SL1 to SLm, a plurality of data lines DL1 to DLn, a plurality of light-emitting lines EL1 to ELm, first and second control lines CSL1 and CSL2, a first power line PL1, a second power line PL2, connection lines CNL, and a pad PD provided in plural including a plurality of pads PD, where m and n are natural numbers. The pixels PX may be disposed in the display region DA and may be connected to respective signal lines among the scan lines SL1 to SLm, the data lines DL1 to DLn, and the light-emitting lines EL1 to ELm.

The scan driver SDV and the light-emitting driver EDV may be disposed in the non-display region NDA. The scan driver SDV and the light-emitting driver EDV may be disposed in portions of the non-display region NDA which are adjacent to each of the long sides of the first panel region AA1. The data driver DDV may be disposed in the second panel region AA2. The data driver DDV may be an integrated circuit chip and mounted on (or in) the second panel region AA2.

The scan lines SL1 to SLm may extend in the second direction DR2 so as to be connected to the scan driver SDV. The data lines DL1 to DLn may extend in the first direction DR1 so as to be connected to the data driver DDV via the bending region BA. The light-emitting lines EL1 to ELm may extend in the second direction DR2 so as to be connected to the light-emitting driver EDV.

The first power line PL1 may extend in the first direction DR1 so as to be disposed in the non-display region NDA. The first power line PL1 may be disposed between the display region DA and the light-emitting driver EDV. However, without being limited thereto, the first power line PL1 may be disposed between the display region DA and the scan driver SDV.

The first power line PL1 may extend to the second panel region AA2 via the bending region BA. When viewed on a plane, the first power line PL1 may extend toward the lower end of the second panel region AA2. The first power line PL1 may receive a first voltage.

The second power line PL2 may be disposed in the non-display region NDA facing the second panel region AA2 with the display region DA and the non-display region NDA interposed therebetween and adjacent to the long sides of the first panel region AA1. The second power line PL2 may be disposed outside the scan driver SDV and the light-emitting driver EDV, that is, further from the display area DA than the scan driver SDV and the light-emitting driver EDV.

The second power line PL2 may extend to the second panel region AA2 via the bending region BA. The second power line PL2 may extend in the first direction DR1 in the second panel region AA2 with the data driver DDV interposed therebetween. When viewed on a plane, the second power line PL2 may extend toward the lower end of the second panel region AA2.

The second power line PL2 may receive a second voltage having a lower level than the first voltage. For the convenience of explanation, although connection relationship is not shown, the second power line PL2 may extend to the display region DA so as to be connected to the pixels PX, and the second voltage may be provided to the pixels PX through the second power line PL2.

The connection lines CNL may extend in the second direction DR2 and be arranged in the first direction DR1. The connection lines CNL may be connected to the first power line PL1 and the pixels PX. The first voltage may be applied to the pixels PX through the connection lines CNL and the first power line PL1 which are connected to each other. The first control line CSL1 may be connected to the scan driver SDV and extend toward the lower end of the second panel region AA2 via the bending region BA. The second control line CSL2 may be connected to the light-emitting driver EDV and extend toward the lower end of the second panel region AA2 via the bending region BA. The data driver DDV may be disposed between the first control line CSL1 and the second control line CSL2.

When viewed on a plane, the pads PD may be disposed adjacent to the lower end of the second panel region AA2. The data driver DDV, the first power line PL1, the second power line PL2, the first control line CSL1, and the second control line CSL2 may be connected to the pads PD.

The data lines DL1 to DLn may be connected to corresponding pads PD, through the data driver DDV. In an embodiment, for example, the data lines DL1 to DLn may be connected to the data driver DDV, and the data driver DDV may be connected to the pads PD corresponding to the data lines DL1 to DLn, respectively.

The display module DM may include a printed circuit board PCB connected to the display panel 100 at the pads PD. Connection pads PCB-PD may be disposed on the printed circuit board PCB, and the connection pads PCB-PD may be connected to the display panel 100 at the pads PD thereof.

A timing controller T-CON (see FIG. 6A) may be disposed on the printed circuit board PCB. The timing controller T-CON may be connected to the pads PD of the display panel 100, through the printed circuit board PCB.

The timing controller T-CON may control the operations of the scan driver SDV, the data driver DDV, and the light-emitting driver EDV. The timing controller T-CON may generate a scan control signal, a data control signal, and a light-emitting control signal in response to control signals received from outside the printed circuit board PCB.

The scan control signal may be provided to the scan driver SDV through the first control line CSL1. The light-emitting control signal may be provided to the light-emitting driver EDV through the second control line CSL2. The data control signal may be provided to the data driver DDV. The timing controller T-CON may receive image signals from outside the timing controller T-CON, convert the data format of the image signals so as to meet the interface specification for the data driver DDV, and provide the converted image signals to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The light-emitting driver EDV may generate a plurality of light-emitting signals in response to the light-emitting control signal. The light-emitting signals may be applied to the pixels PX through the light-emitting lines ELI to ELm.

The pixels PX may receive the data voltages in response to the scan signals. The pixels PX may display an image by emitting light having a luminance corresponding to the data voltages in response to the light-emitting signals. The light-emitting time of the pixels PX may be controlled by the light-emitting signals.

A voltage generator (not illustrated) may be disposed on the printed circuit board PCB. The voltage generator may be connected to the pads PD of the display panel 100 through the printed circuit board PCB. The voltage generator may generate a first voltage and a second voltage. The first voltage and the second voltage may be applied to the first power line PL1 and the second power line PL2.

Each of the pixels PX may include an organic light-emitting element as a display element. The first voltage may be applied to the anode electrode of the organic light-emitting element, and the second voltage may be applied to the cathode electrode of the organic light-emitting element. The organic light-emitting element may be operated with the first voltage and the second voltage applied thereto.

Figure 6A:
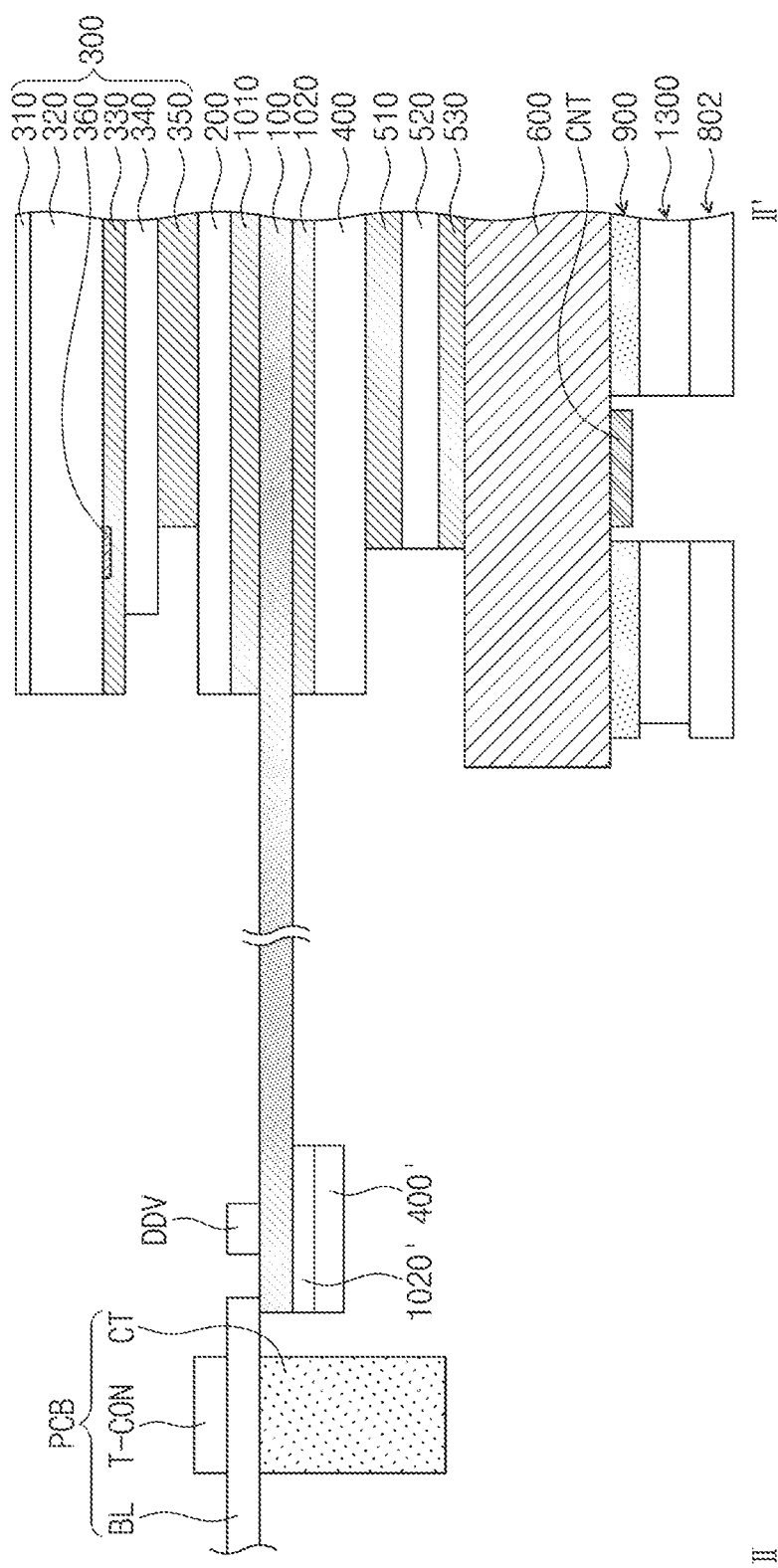
FIGS. 6A and 6B are cross-sectional views of embodiments of a portion of the display device.
Figure 6B:
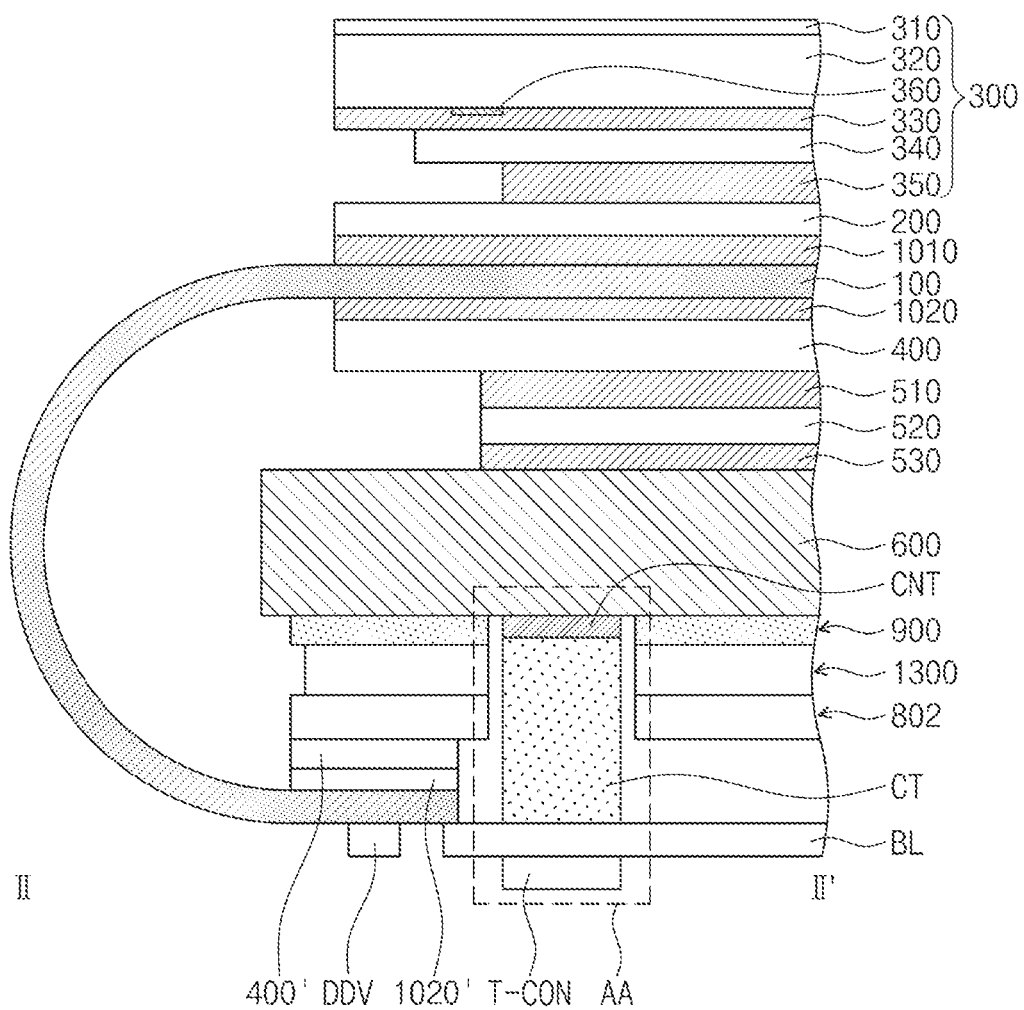
Figure 6C:
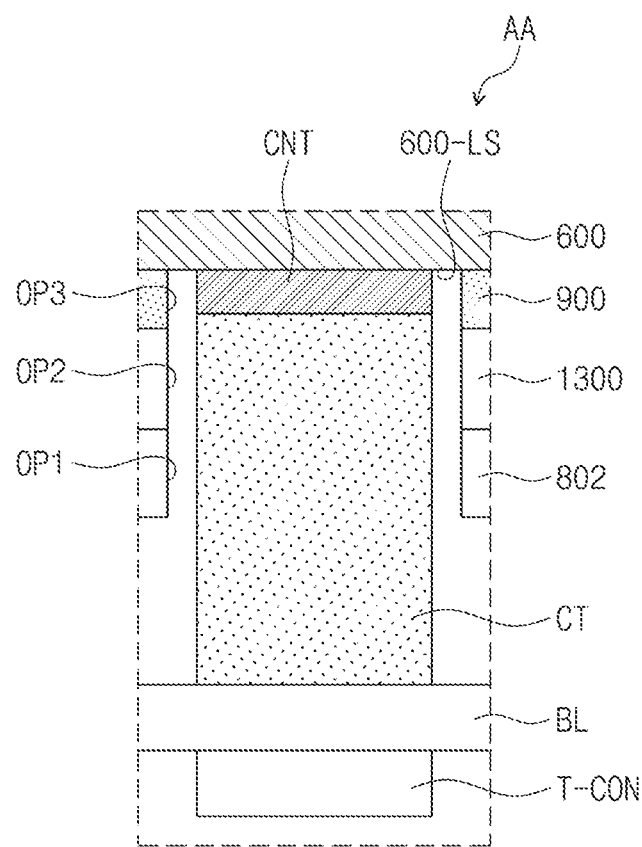
FIG. 6C is an enlarged cross-sectional view of an embodiment of the display device.
Figure 7:
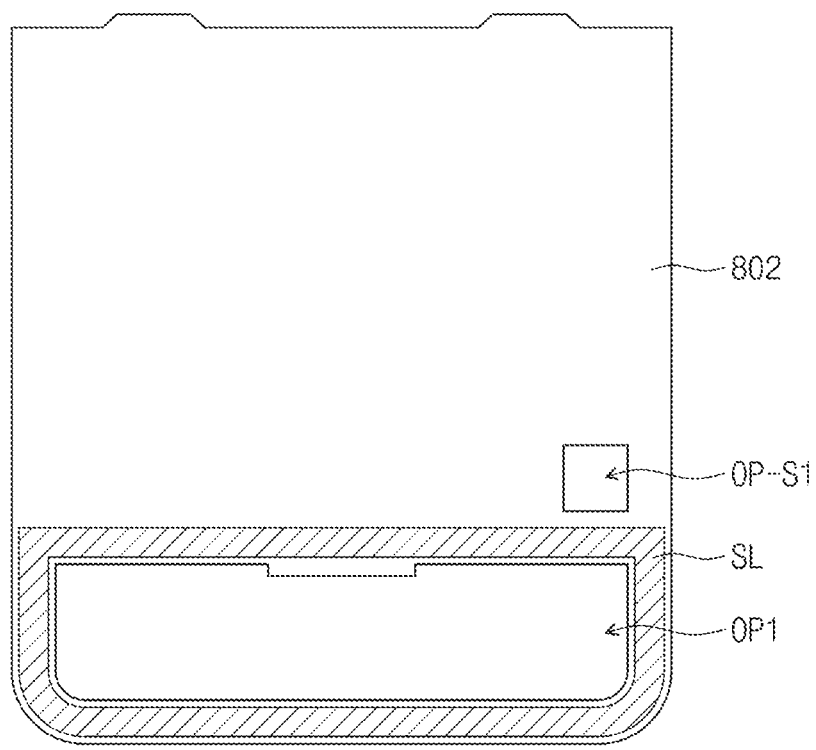
FIG. 7 is a plan view of an embodiment of an end portion of the display device.

FIGS. 6A and 6B are cross-sectional views of embodiments of an end portion of the display device 1000. FIG. 6C is an enlarged view of an embodiment of a portion of a cross-section of a portion of the display device 1000. FIG. 7 is a plan view of an embodiment of an end portion of the display device 1000. FIGS. 6A and 6B illustrate cross-sections corresponding to line II-II' illustrated in FIG. 5. FIG. 6A illustrates an end portion of the display module DM which is unfolded or flat at the bending region BA in a cross section corresponding to line II-IT' illustrated in FIG. 5. FIG. 6B illustrates an end portion of the display module DM which is folded or bent at the bending region BA in a cross section corresponding to line II-II' illustrated in FIG. 5. FIG. 6C is an enlarged cross-sectional view of a region AA illustrated in FIG. 6B.

Referring to FIGS. 4, 5, and 6A to 6C together, the lower protective film 400 and the second intermediate adhesive layer 1020 may not be disposed under the display panel 100 at the bending region BA. A portion 400' of the lower protective film 400 and a portion 1020' of the second intermediate adhesive layer 1020 may be disposed under the display panel 100 at the second panel region AA2. The data driver DDV may be disposed on an upper surface of the display panel 100 at the second panel region AA2. Although not illustrated, a cover member may be further included on the upper surface of the display panel 100 overlapping the bending region BA. The cover member may perform a function of relieving stress which occurs at the bending region BA as the display panel 100 is bent.

The printed circuit board PCB may be connected to the display panel 100 at the end portion thereof. In an embodiment, for example, the printed circuit board PCB may be connected to one side of the second panel region AA2.

The printed circuit board PCB may include a main layer BL (e.g., base layer) and a timing controller T-CON which is disposed on the main layer BL. The timing controller T-CON may be formed as an integrated circuit chip and mounted on the upper surface of the main layer BL.

A conductive pattern CT disposed under the main layer BL may be included. The conductive pattern CT may include a conductive material. The conductive pattern CT may not include a separate adhesive material. The conductive pattern CT may be disposed on the lower surface of the main layer BL, and may be disposed so as to be spaced apart from the timing controller T-CON with the main layer BL interposed therebetween.

The display panel 100 which is bent at the bending region BA may dispose the second panel region AA2 under the first panel region AA1 (FIG. 6B). Accordingly, the data driver DDV and the printed circuit board PCB may be disposed under the first panel region AA1. The display panel 100 which is bent at the bending region BA may dispose the data driver DDV and the printed circuit board PCB under the second plate 800. The lower surface of the main layer BL included in the printed circuit board PCB may be disposed so as to face the lower plate surface 600-LS of the first plate 600.

The second sub-plate 802 of the second plate 800 may have a first opening OP1 defined therein. The step compensation layer 1300 may have a second opening OP2 defined therein. The cover layer 900 may have a third opening OP3 defined therein. The first opening OP1, the second opening OP2, and the third opening OP3 may entirely overlap each other on a plane and have an aligned shape as the first opening OP1, the second opening OP2, and the third opening OP3 have the same width on a plane. However, without being limited thereto, at least any one of the first opening OP1, the second opening OP2, and the third opening OP3 may not be aligned with the other openings.

The display panel 100 which is bent at the bending region BA may dispose the conductive pattern CT inside the first opening OP1, the second opening OP2, and the third opening OP3. A contact part CNT may be disposed on the lower plate surface 600-LS of the first plate 600. The contact part CNT may be disposed on the lower plate surface 600-LS of the first plate 600 which is exposed to outside the display module DM at the first opening OP1, the second opening OP2, and the third opening OP3. The conductive pattern CT may be disposed inside the first opening OP1, the second opening OP2, and the third opening OP3 so as to be adjacent to the exposed lower plate surface 600-LS of the first plate 600. In an embodiment, the conductive pattern CT may come in contact with the contact part CNT disposed on the lower plate surface 600-LS of the first plate 600. As the conductive pattern CT included in the printed circuit board PCB comes in contact with the contact part CNT, the printed circuit board PCB may be grounded. In an embodiment, the contact part CNT (e.g., grounding pattern) may be omitted. When the contact part CNT is omitted, the conductive pattern CT may come in direct contact with the lower plate surface 600-LS of the first plate 600.

Although not illustrated, a double-sided tape may be further disposed on the lower surface of the conductive pattern CT of the printed circuit board PCB which is furthest from the timing controller T-CON. The double-sided tape may be disposed inside the first opening OP1, the second opening OP2, and the third opening OP3 so as to be attached to the lower plate surface 600-LS of the first plate 600. As the double-sided tape may be attached to the lower plate surface 600-LS of the first plate 600, the timing controller T-CON and the like included in the printed circuit board PCB may be fixed to the first plate 600.

Although not illustrated, a dummy tape may be disposed on the lower plate surface 600-LS of the first plate 600 which is furthest from the display panel 100. The double-sided tape may be disposed on the lower plate surface 600-LS of the first plate 600 with the dummy tape interposed therebetween. The dummy tape may be a single-sided tape that includes an adhesive on a side adjacent to the lower plate surface 600-LS of the first plate 600 and does not include an adhesive on a side adjacent to the double-sided tape. The dummy tape may reduce or effectively prevent adhesion failure of the double-sided tape disposed on the printed circuit board PCB.

Referring to FIGS. 4, 5, 6B and 7 together, a sealing layer SL may be disposed on the second sub-plate 802 in which the first opening OP1 is defined among the sub-plates of the second plate 800. The sealing layer SL may be a waterproofing layer that reduces or effectively prevents moisture or the like from penetrating into the display device 1000. In an embodiment, for example, the sealing layer SL may be a tape having a waterproofing function or a cured layer formed by curing a resin having a waterproofing function. The sealing layer SL may be disposed adjacent to an edge of the first opening OP1. The sealing layer SL may be disposed along an edge of a portion of the second sub-plate 802 having the first opening OP1 defined therein and may be disposed so as to surround the first opening OP1 in the plan view.

One or more embodiment of the display device 1000 has a structure in which a portion of the lower plate surface 600-LS of the first plate 600 which is furthest from the display panel 100 is exposed to outside the display module DM by the first opening OP1 defined in the second plate 800 facing the first plate 600, while a conductive pattern CT of a printed circuit board PCB is in the first opening OP2 and comes in contact with a component disposed on the lower plate surface 600-LS of the first plate 600 or in contact with the lower plate surface 600-LS of the first plate 600. Due to this structure, the printed circuit board PCB may be grounded to the lower plate surface 600-LS of the first plate 600 while implementing a waterproofing structure by using a waterproofing tape or the like around the first opening OP1 defined in the second plate 800. That is, one or more embodiment of the display device 1000 may be capable of securing waterproofing properties due to a lower metal plate structure (e.g., the first plate 600 together with the second plate 800), thus improving the waterproofness of the display device 1000.

According to one or more embodiment, while support plates are doubly provided within a metal plate structure to be disposed under the display panel 100, a heat dissipation layer 700 is provided between the support plates along the thickness direction, and an opening is provided in the support plates so that at least a portion of the printed circuit board PCB may extend from outside the support plates be disposed inside the opening of the support plates. Accordingly, implementing a waterproofing structure along the edge of the opening provided in the support plates is possible, thus securing the waterproofing properties of the display device 1000.

Although the invention has been described with reference to embodiments, those skilled in the art or those of ordinary skill in the art will understand that the invention may be variously modified and changed within the scope not departing from the spirit and technical scope of the invention described in the claims to be described later.

Therefore, the technical scope of the invention should not be limited to the contents described in the detailed description of the specification, but should be determined by the claims below.

What is claimed is:

1. A display device comprising:
a display panel comprising a folding region at which the display panel is foldable; and
in order from the display panel:
a first plate facing the display panel and including a lower surface furthest from the display panel;
a heat dissipation layer facing the first plate; and
a second plate facing the heat dissipation layer, the second plate defining a first opening at which the lower surface of the first plate is exposed to outside the second plate,
wherein the heat dissipation layer does not overlap the first opening on a plane.

2. The display device of claim 1, further comprising a printed circuit board connected to the display panel, the printed circuit board comprising:
a base layer; and
a conductive pattern on the base layer,
wherein
the printed circuit board faces the lower surface of the first plate with the second plate therebetween, and
the conductive pattern of the printed circuit board is inside the first opening of the second plate.

3. The display device of claim 2, further comprising a grounding pattern which is on the lower surface of the first plate and exposed to outside the second plate at the first opening of the second plate,
wherein the conductive pattern of the printed circuit board is in contact with the grounding pattern.

4. The display device of claim 3, wherein the printed circuit board further comprises a timing controller facing the conductive pattern with the base layer therebetween.

5. The display device of claim 2, wherein the first plate comprises a plate folding portion which corresponds to the folding region of the display panel and defines a plurality of openings of the first plate.

6. The display device of claim 5, further comprising a cover layer between the first plate and the heat dissipation layer,
wherein the cover layer covers the plurality of openings of the first plate.

7. The display device of claim 6, further comprising a step compensation layer between the cover layer and the second plate, the step compensation layer spaced apart from the heat dissipation layer in an extension direction along the display panel.

8. The display device of claim 7, wherein
the step compensation layer defines a second opening at which the lower surface of the first plate is exposed to outside the step compensation layer and which corresponds to the first opening of the second plate; and
the conductive pattern of the printed circuit board is inside the second opening of the step compensation layer.

9. The display device of claim 6, wherein:
the cover layer defines a third opening at which the lower surface of the first plate is exposed to outside the cover layer and which corresponds to the first opening of the second plate; and
the conductive pattern of the printed circuit board is inside the third opening of the cover layer.

10. The display device of claim 2, wherein:
the display panel further comprises a first non-folding region, the folding region, and a second non-folding region in order along a first direction,
the second plate comprises a first sub-plate corresponding to the first non-folding region and a second sub-plate corresponding to the second non-folding region; and
the first sub-plate and the second sub-plate are spaced apart from each other along the first direction, at the folding region.

11. The display device of claim 10, wherein:
the first opening is defined in the second sub-plate; and
the printed circuit board faces the first plate with the second sub-plate therebetween.

12. The display device of claim 10, further comprising:
a scaling layer on the second sub-plate, and not overlapping the first opening on the plane.

13. The display device of claim 1, further comprising:
a first adhesive layer between the first plate and the heat dissipation layer; and
a second adhesive layer between the heat dissipation layer and the second plate.

14. The display device of claim 13, wherein:
the first adhesive layer is in contact with the lower surface of the first plate, and an upper surface of the heat dissipation layer which is closest to the display panel; and
the second adhesive layer is in contact with a lower surface of the heat dissipation layer which is furthest from the display panel, and an upper surface of the second plate which is closest to the display panel.

15. The display device of claim 13, wherein the first adhesive layer, the second adhesive layer and the heat dissipation layer are non-overlapping with the first opening of the second plate.

16. The display device of claim 1, further comprising:
an anti-reflection layer facing the first plate with the display panel therebetween; and
a protective film facing the display panel with the anti-reflection layer therebetween.

17. The display device of claim 1, wherein
the display panel further comprises a first non-folding region, the folding region, and a second non-folding region in order, and
the heat dissipation layer comprises:
a first heat dissipation portion corresponding to the first non-folding region;
a second heat dissipation portion corresponding to the second non-folding region;
a third heat dissipation portion corresponding to the folding region, and
the third heat dissipation portion bent at the folding region.

18. A display device comprising:
a display panel comprising a folding region at which the display panel is foldable;
a printed circuit board connected to the display panel, the printed circuit board comprising a base layer and a conductive pattern which is on the base layer; and
in order from the display panel:
   a first plate facing the display panel;
   a heat dissipation layer facing the first plate; and
   a second plate facing the heat dissipation layer, the second plate defining a first opening,
wherein
the conductive pattern of the printed circuit board is inside the first opening of the second plate, and
the heat dissipation layer does not overlap the first opening on a plane.

19. The display device of claim 18, wherein:
the first plate comprises a lower surface which is furthest from the display panel and a grounding pattern which is on the lower surface,
the first opening of the second plate at which the lower surface of the first plate is exposed to outside the second plate; and
the conductive pattern of the printed circuit board is in contact with the grounding pattern.

20. An electrnic device comprising:
a display device comprising:
a display panel comprising a non-folding region, and a folding region which is adjacent to the non-folding region;
a printed circuit board connected to the display panel; and
in order from the display panel:
   a first plate facing the display panel;
   a heat dissipation layer facing the first plate; and
   a second plate facing the heat dissipation layer, the second plate defining a first opening corresponding to the non-folding region of the display panel,
wherein
a portion of the printed circuit board is inside the first opening of the second plate, and
the heat dissipation layer does not overlap the first opening on a plane.

* * * * *